United States Patent [19]
Margeson

[11] Patent Number: 5,638,083
[45] Date of Patent: Jun. 10, 1997

[54] SYSTEM FOR ALLOWING SYNCHRONOUS SLEEP MODE OPERATION WITHIN A COMPUTER

[75] Inventor: James E. Margeson, Santa Clara, Calif.

[73] Assignee: Chips and Technologies, Inc., San Jose, Calif.

[21] Appl. No.: 419,843

[22] Filed: Apr. 11, 1995

Related U.S. Application Data

[63] Continuation of Ser. No. 88,471, Jul. 7, 1993, abandoned.

[51] Int. Cl.$^6$ .................................................. G09G 1/06
[52] U.S. Cl. ........................... 345/10; 345/212; 395/750; 395/551; 364/707
[58] Field of Search ............................ 345/191, 211, 345/10, 212, 213; 395/375, 550, 750; 364/707

[56] References Cited

U.S. PATENT DOCUMENTS

| | | | |
|---|---|---|---|
| 4,317,181 | 2/1982 | Teza et al. | 364/707 |
| 4,409,665 | 10/1983 | Tubbs | 364/707 |
| 4,673,930 | 6/1987 | Bwjalaski et al. | 345/24 |
| 4,698,748 | 10/1987 | Juzswik et al. | 364/200 |
| 4,748,559 | 5/1988 | Smith et al. | 364/200 |
| 5,021,983 | 6/1991 | Nguyen et al. | 364/207 |
| 5,025,387 | 6/1991 | Frane | 364/493 |
| 5,059,961 | 10/1991 | Cheng | 345/10 |
| 5,083,266 | 1/1992 | Wantanabe | 395/275 |
| 5,167,024 | 11/1992 | Smith et al. | 395/375 |
| 5,182,810 | 1/1993 | Bartling et al. | 395/750 |
| 5,426,755 | 6/1995 | Yokouchi et al. | 364/707 |
| 5,485,625 | 1/1996 | Gumkowski | 364/707 |
| 5,502,689 | 3/1996 | Peterson et al. | 364/707 |

FOREIGN PATENT DOCUMENTS

| | | |
|---|---|---|
| 0364222 | 11/1990 | European Pat. Off. . |
| 0404182 | 12/1990 | European Pat. Off. . |

*Primary Examiner*—Richard Hjerpe
*Assistant Examiner*—Amare Mengistu
*Attorney, Agent, or Firm*—Benman Collins & Sawyer

[57] ABSTRACT

A system is provided that allows for the synchronous operation of a memory controller within a computer when the local bus clock has become inactive for a predetermined period of time. The system includes a circuit that senses the presence of the local bus clock and dependent upon whether the local bus clock is active or inactive causes a switching circuit to switch to a second clock signal that is independent of the local bus clock to run the memory controller. In one embodiment, a pixel clock signal is utilized to run the memory controller when the local bus clock signal is not active.

10 Claims, 6 Drawing Sheets

1

SYSTEM FOR ALLOWING SYNCHRONOUS SLEEP MODE OPERATION WITHIN A COMPUTER

This is a continuation of application Ser. No. 08/088,471 filed on Jul. 7, 1993 which was abandoned.

FIELD OF THE INVENTION

The present invention relates to memory controllers, and more particularly the present invention relates to a memory controller that displays data when a microprocessor is in a sleep mode.

BACKGROUND OF THE INVENTION

A memory controller within a computer can be designed to run synchronously or asynchronously with the local bus associated with the central processing unit (CPU). The problem with running the memory controller asynchronously with the bus is that the overall system performance is not as good, bus control signal synchronization delays are present and interaction with the bus is oftentimes not as predictable.

Accordingly, it is desirable to be able to operate the memory controller synchronously with the local bus in the computer. In so doing, since the speed associated with various performance characteristics of the computer are enhanced and because the signals are synchronous, the interaction with the bus is more predictable.

Furthermore, it is desirable to be able to stop the local bus clock associated with the CPU and its local bus as a power-saving feature while at the same time the memory controller continues to display an image. In laptops, notebook and portable computers this power saving feature, known as sleep mode, is very important to extending the battery life of the computer. In so doing, the memory controller runs on the local bus clock and must be active to execute memory cycles to refresh the display and refresh the frame buffer memory associated with the computer.

A known solution to this problem has been to provide a separate local bus clock that continued running while the computer is in the sleep mode. However, this scheme is undesirable because a separate local bus clock would have a skew from the clock that the processor uses, which would reduce how quickly the frame memory could be accessed. The additional clock would therefore reduce reliability and would also require additional clock generation circuitry. As has been above mentioned, this additional circuitry would be undesirable because it would consume additional power.

Accordingly, what is needed is a memory controller system which can operate synchronously with the local bus clock but when in a sleep mode doesn't require the additional circuitry and additional unreliability associated with providing a separate local bus clock. The present invention addresses such a need.

SUMMARY OF THE INVENTION

The present invention utilizes a second clock signal that is already part of the computer but independent of the local bus for running the memory controller when the local bus clock signal is stopped or in the sleep mode. The present invention comprises means for sensing when the local bus clock has been stopped for a predetermined period of time and means for switching from the memory controller to the second clock signal that remains running during the sleep mode. In so doing, the clock can be used to maintain the refresh rate and the screen rate associated with a computer. The present invention further includes means for switching back to the local bus clock signal by sensing a level transition of the local bus clock signal. The present invention provides for an improved performance in the memory controller operation by running synchronously with the CPU to add the better performance characteristics therewithin. It also through the transitioning from one clock to the other allows for reduced consumption of power while still maintaining the display screen of the memory controller.

DETAILED DESCRIPTION OF THE INVENTION

The present invention relates to an improvement in the memory controller when the microprocessor within a computer is in a sleep mode. The following description is presented to enable one of ordinary skill in the art to make and use the invention as provided in the context of a particular application and its requirements. Various modifications to the preferred embodiments will be readily apparent to those skilled in the art, and the generic principles defined here may be applied to other embodiments. Thus, the present invention is not intended to be limited to the embodiments shown, but is to be accorded the widest scope consistent with the principles and novel features disclosed herein.

Figure 1:
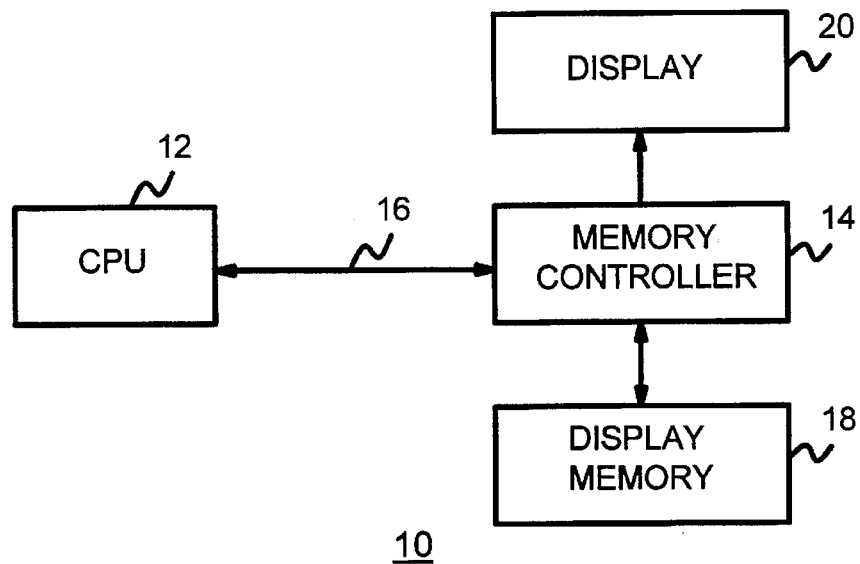
FIG. 1 is a simplified block diagram of a typical computer.

Referring now to FIG. 1, what is shown are the portions of computer 10 relevant to the present invention. It should be recognized by one of ordinary skill in the art that there are other portions of a computer 10 that are required to provide for efficient operation of the computer 10. The computer 10 includes a central processing unit (CPU) 12 which sends control and clock signals to memory controller 14 via local bus 16. The memory controller 14 controls data from display memory 18 that is provided to the display 20. The display 20 can be a cathode ray tube (CRT) display or a flat panel display. In many computer environments where power is at a premium, such as in a portable computing environment, when the computer is not being used for a predetermined period of time while the power switch is still on, the computer is put into a "sleep mode." What is meant by sleep mode is that power is significantly reduced when the computer is not being used for a predetermined period of time.

In previously known systems that included a sleep mode feature, the memory controller 14 runs asynchronously with the bus clock. However, this significantly reduced the rendering speed of the controller when displaying information from the display memory 18 to the display 20.

The present invention uses to advantage the pixel clock which is already generated within the computer to provide the clock signal when the computer is put in a sleep mode. In so doing, the memory controller can continue to operate the memory refresh and allows for refreshing the display. The pixel clock is oftentimes generated by a crystal oscillator or the like to run the video memory at a different frequency than the local bus clock. Although the pixel clock is utilized advantageously in the present invention, one of ordinary skill in the art will readily recognize that a variety of other clock signals can be utilized, the only condition of that clock signal that is important to the operation of the present invention is that the clock not be tied to the local bus clock and that the clock be capable of maintaining the refresh rates of the memory controller.

Figure 2:
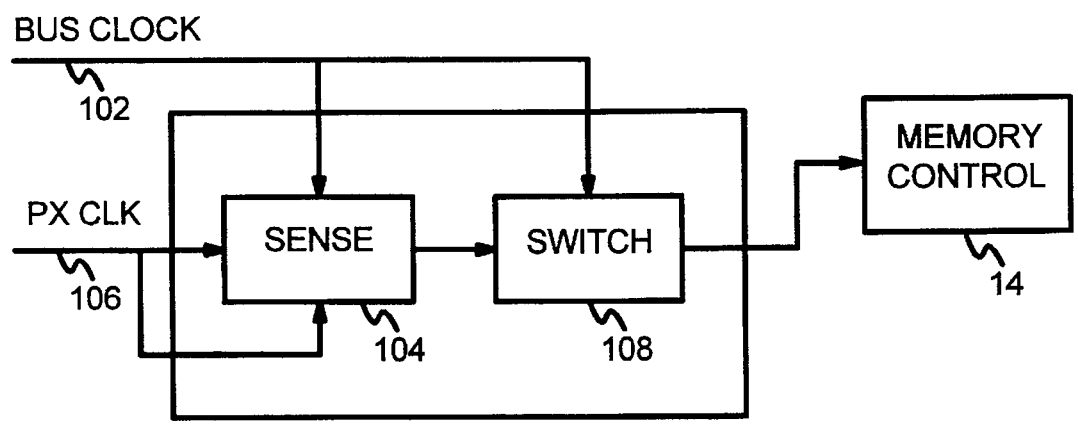
FIG. 2 is a block diagram of a circuit in accordance with the present invention for controlling a microprocessor controlling the display screen when the microprocessor is in a sleep mode.

Referring now to FIG. 2, what is shown in a simple block diagram is circuitry for allowing the memory controller to operate from the pixel clock or the local bus clock. The sensing and switching circuit 100 comprises a sensing block 104 which senses the local bus clock signal 102 and the pixel clock signal 106 and a switch block 108 which allows for signals 102 and 106 to drive the memory controller 14. The sensing block 104 during normal operation will propagate the local bus clock through, but when the processor is in sleep mode, and the CPU clock signal is off, then the pixel clock is switched in by the switching block 108 so that the memory controller can continue to refresh the memory. When the CPU clock begins to operate again, that is the CPU is out of sleep mode, then the sensing block 104 senses that change and the switching block 108 then causes the memory controller 14 to operate from the local bus clock 102.

Hence, through this system a memory controller can operate synchronously with the CPU and have the performance advantages associated therewith, while at the same time not requiring any additional or clock generation circuitry. To more particularly describe the operation of the present invention refer now to FIG. 3 which is a more detailed block diagram of the circuitry of FIG. 2.

Figure 3:
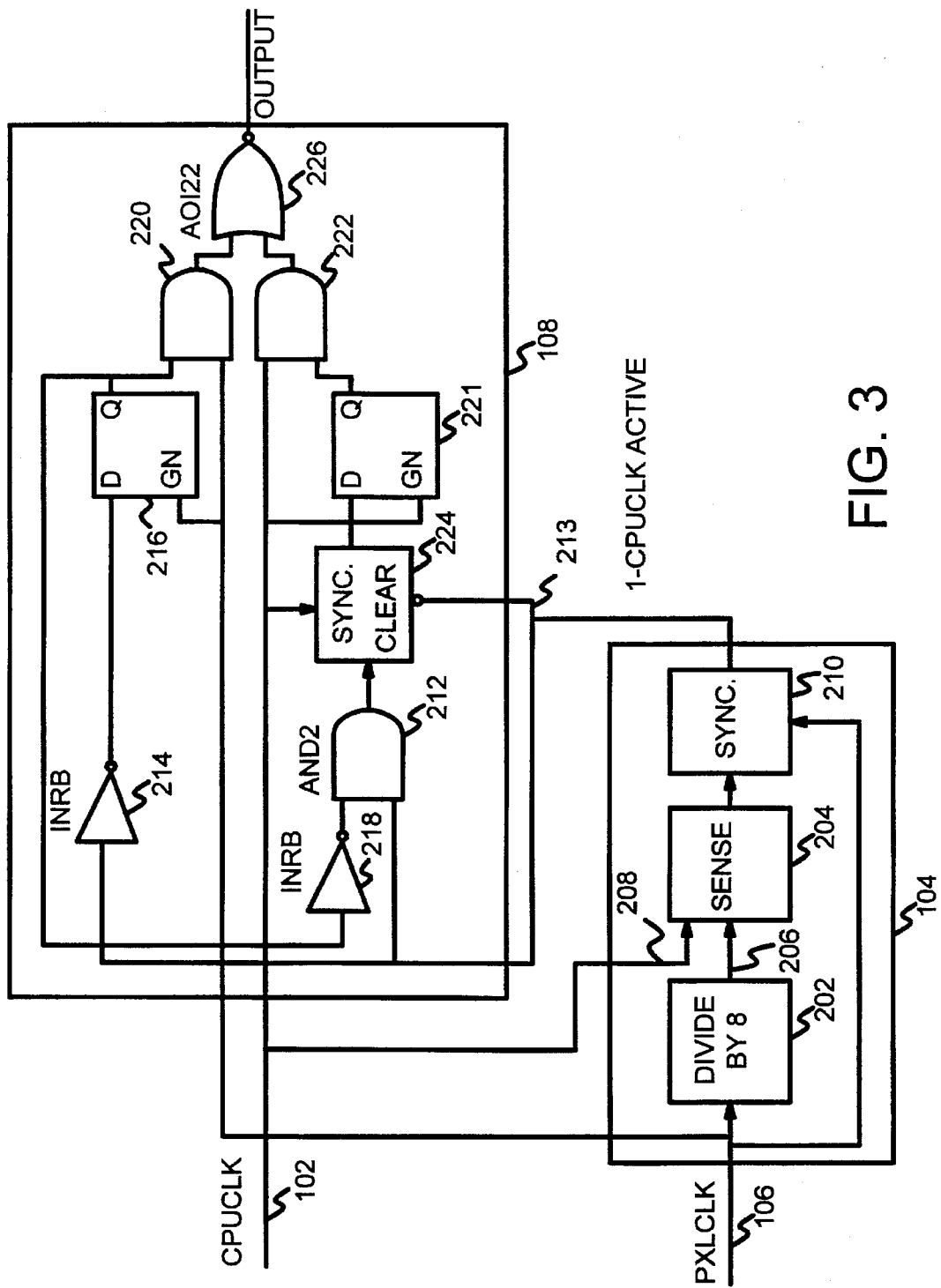
FIG. 3 is a more detailed block diagram of the circuit in accordance with the present invention.

Referring now to FIG. 3, the pixel clock signal 106 is provided to a counter 202. In a computer, a pixel clock is utilized to generate control signals and data to refresh the frame memory and the display. Since the clock rate of the video information is different from the clock rate of the CPU a clock signal is utilized, the pixel clock, that is independent of the local bus clock. Depending upon the architecture, the pixel clock is specified to be at a predetermined range of frequencies based upon the local bus clock frequency. In a typical computer architecture the pixel clock is specified to be between one-quarter (¼) to four (4) times the clock rate of the local bus clock.

In this embodiment, the counter 202 is a divide by 8 counter. Accordingly, every eight counts, the counter 202 provides an enable signal. It should be recognized, however, that the number of counts can be different and that use would be within the spirit and scope of the present invention. The output of the counter 202 is coupled to a first input 206 of sense circuit 204. A second input 208 of the sense circuit 204 is coupled to the local bus clock signal 102. The output of the sense circuit 204 is coupled to a first synchronization circuit 210.

The output of the synchronization circuit 210 is coupled to one input of AND gate 212 and to the input of an inverter 214. The output of inverter 214 is coupled to the data input of a latch 216. The output of latch 216 is coupled in a feedback fashion to input of a second inverter 218 and is also coupled to a first input of a second AND gate 220. A second input of AND gate 220 is coupled to the GN terminal of latch 216 as well as to the pixel clock signal 106. The local bus clock signal is also coupled to a first input of a third AND gate and a second synchronization circuit 224 and the GN terminal of a second latch 225.

The output from inverter 218 is coupled to a second input of AND gate 212. The output of AND gate 212 is provided to the input of synchronization circuit 224. The output of latch 225 is provided to a second input of AND gate 222. The output from AND gates 220 and 222 are provided to first and second inputs of NOR gate 226, respectively. The output of NOR gate 226 is coupled to the input of a third inverter 228. The output of the inverter 228 is provided to the memory controller.

Figure 4:
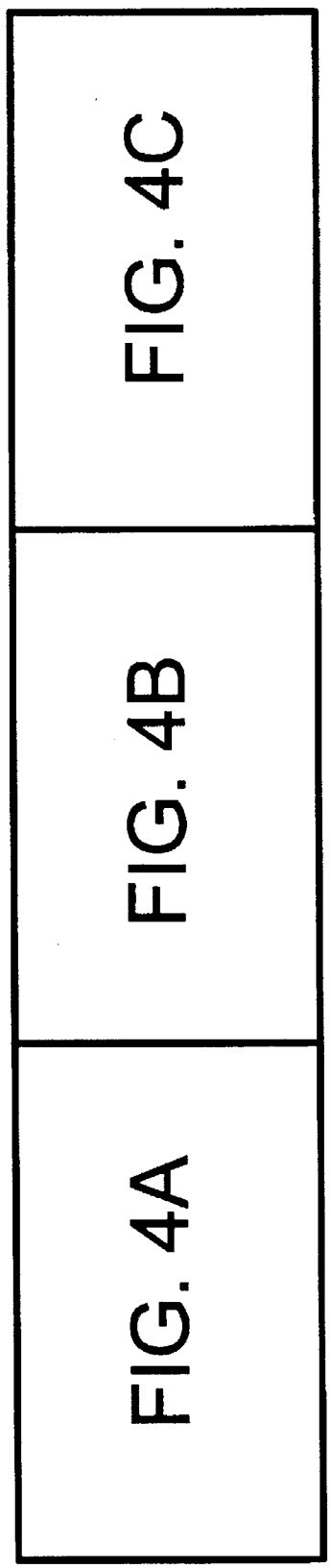
FIG. 4 is a timing diagram of the relevant signals of the circuit of FIG. 3.
Figure 4A:
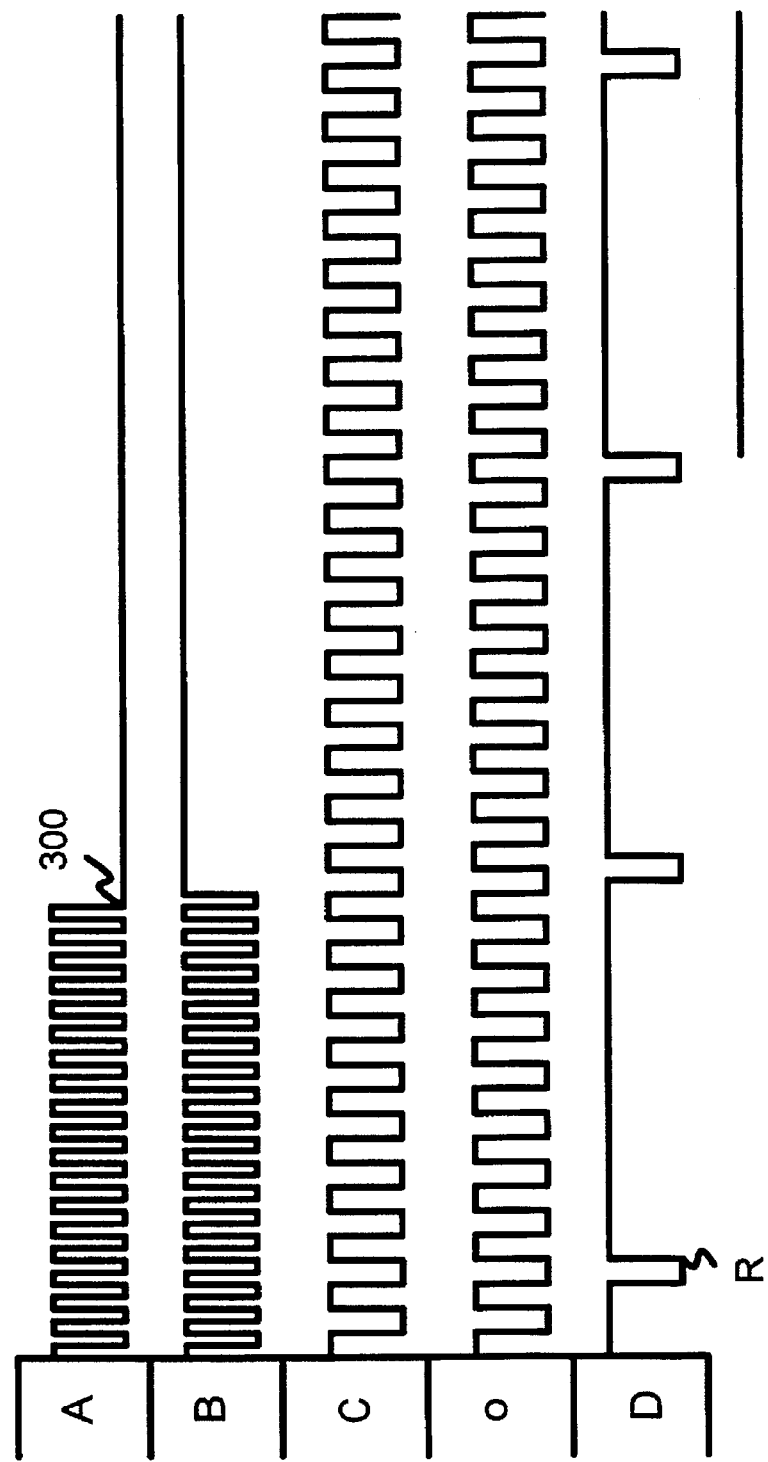
Figure 4B:
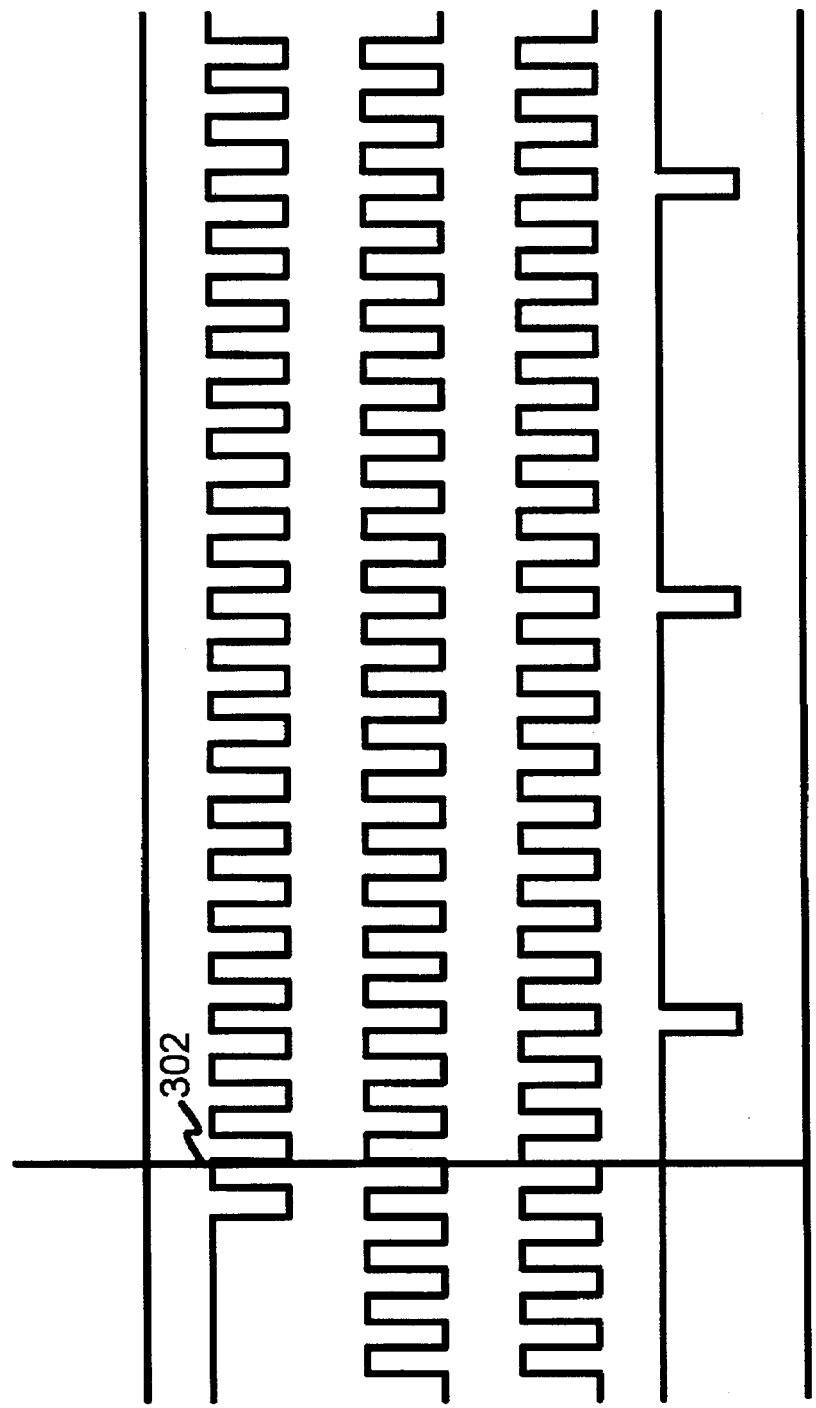
Figure 4C:
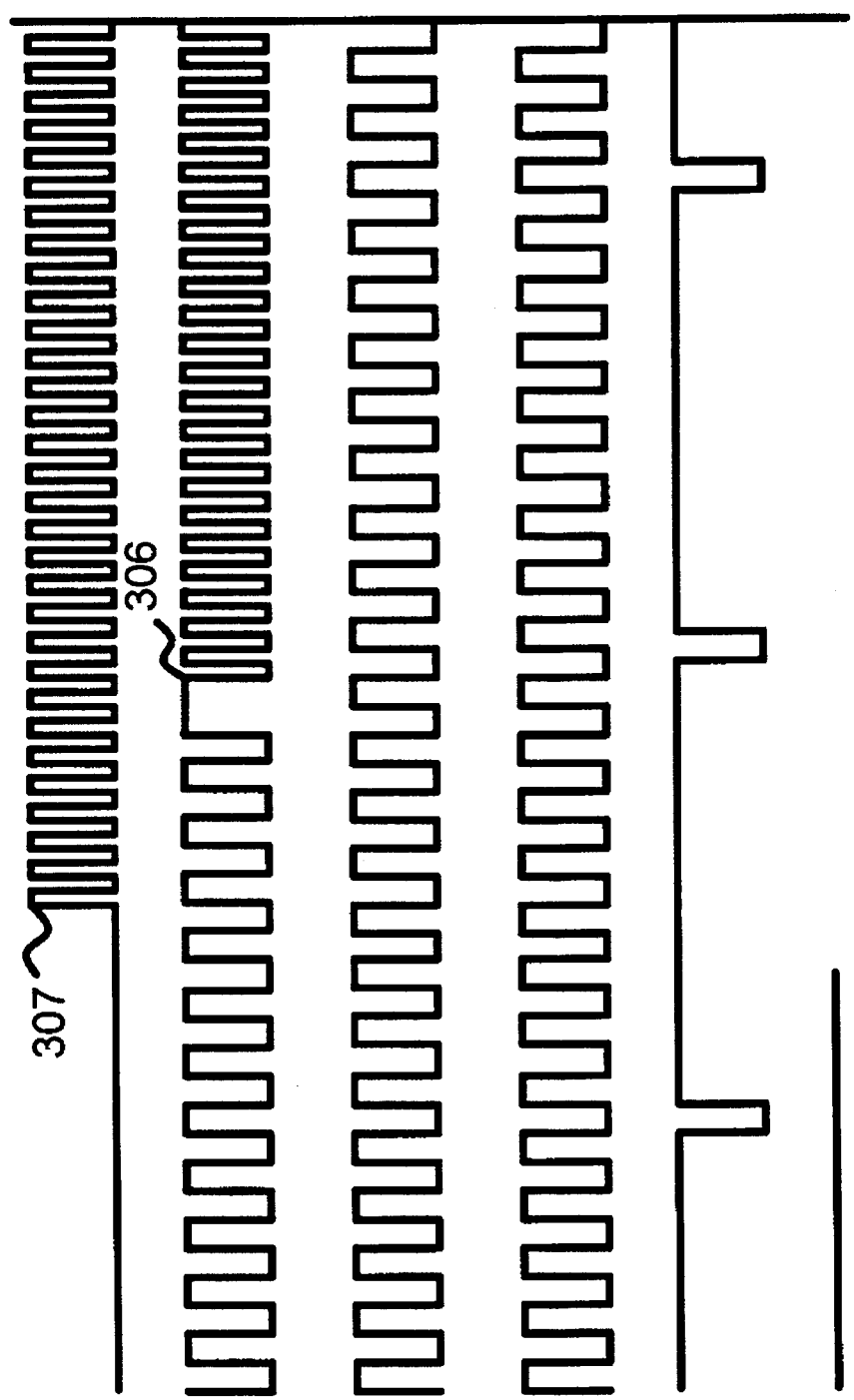

Referring now to FIG. 4 which shows a timing diagram of the above identified circuit 100. FIG. 4, in conjunction with the block diagram of FIG. 3, will show the operation of the circuit 100. FIG. 4 shows local bus clock signal waveform A, the output waveform B, the pixel clock signal waveform C and the output of the divide by 8 counter waveform D respectively.

Hence, in the normal mode, both clock signals 102 and 104 are active. The first input to AND gate 220 is set such that the pixel clock cannot propagate. The second input to AND gate 222 is set such that the local bus clock signal 102 can propagate through to the output (waveform B). When the local bus clock shuts off as shown at 300 of waveform A of FIG. 4, i.e., the computer is starting the sleep mode. For the memory controller to be able to operate even though power consumption is significantly reduced, there is a need to switch over to another clock to keep the memory controller operating. As has been before mentioned, the pixel clock is utilized in this embodiment to drive the memory controller when the computer is placed in the sleep mode. The present invention allows for the efficient switching over to this second clock signal to avoid glitches in the output as switching occurs.

The pixel clock signal is provided to the counter 202, which in this embodiment provides an event for every eight pixel clock cycles as shown at waveform D. The sense circuit 204 includes a flag that clears every time there is a low-going pulse from signal 206. The sense circuit 204 also senses the local bus clock. When the local bus clock goes high, the flag is set. Therefore, the sense circuit looks at the flag at the end of the eight pixel clock period. If the flag is set, then that indicates the local bus clock is active and the computer is not in the sleep mode. Since the local bus clock has stopped as indicated at 300 on waveform A, then the flag is not set and that indicates the local bus clock is not active. The signal from the sense circuit 204 is synchronized with pixel clock signal via the synchronization circuit 210.

The synchronization circuit 210 provides an output—in this case "0"—that effectively turns off the synchronization circuit 224. When the change in the output of the synchronization circuit 210 occurs, two events happen. First, synchronization circuit 224 is cleared via line 213. Accordingly an "0" value propagates through latch 225. The "0" value from latch 225 inhibits propagation of local bus clock signal through AND gate 222. The propagation of the local bus clock is inhibited even though the signal is presently inactive. Therefore, when the local bus clock resumes in the future there will be an efficient synchronized switch over. Second, it allows the pixel clock signal to propagate due to operation of inverter 214 and latch 216. As seen at 302 of waveform B the output of the circuit 100 is now in synchronization with the pixel clock signal. Hence, while the local bus clock signal is inactive, the pixel clock signal will drive the memory controller.

Then, when the local bus clock becomes active as shown at point 304 of waveform A, it is desirable to switch the memory controller 14 over to the local bus clock. The local bus clock goes high and sets the flag in the sense circuit 204. The local bus clock will contiue to set the flag during each eight pixel clock period a long as it is active. This indicats that the local bus clock is active and the computer is no longer in the sleep mode. The sense circuit provides a "1" to the synchronization circuit 210.

Synchronization circuit 210 outputs a "1" causing three actions to occur. First, the clear input to synchronization circuit 224 is deasserted. Second, initially the "1" provided AND gate 212 but does not propagate through the AND gate because inverter 218 is initially outputting an "0".

Thirdly, the "1" from synchronization circuit 210 is provided to the inverter 214. The output of inverter 214 changes from "1" to "0" after the falling edge of the pixel clock signal 106. This change causes two events. First AND gate 200 inhibits propagation of the pixel clock signal 106. Second, the output of inverter 218 changes from "0" to "1".

Since the output of inverter 218 is now a "1" both inputs to AND gate 212 are "1", therefore, the output of AND gate 212 changes to "1". This "1" is provided to the synchronization circuit 224, where it is synchronized to the CPU clock and output to latch 225. After the falling edge of the local bus clock, the output of latch 225 changes from "0" to "1". The output of latch 225 and the active local bus clock signal allows for the local bus clock signal to propagate to the output.

Accordingly, through the present invention the memory controller during the normal operation runs on the local bus clock. When the local bus clock signal is inactive for a predetermined period of time, this inactivity is sensed and the controller is synchronously transferred to another clock signal. Finally, when the local bus clock signal resumes activity the circuitry of the present invention senses a level transition of the local bus clock signal and this causes the memory controller to resume running on the local bus clock signal.

Although the present invention has been described in accordance with the embodiments shown in the Figures, one of ordinary skill in the art recognizes that there could be variations those embodiments and those variations would be within the spirit and scope of the present invention. Accordingly, many modifications may be made by one of ordinary skill in the art without departing from the spirit of the present invention, the scope of which is defined solely by the appended claims.

I claim:

1. A system for allowing a memory controller within a computer to display information when the computer is in a sleep mode comprising:

a first clock signal, the first clock signal normally being active and driving the memory controller and being inactive when the system is in the sleep mode;

a second clock signal, the second clock signal being active independently of the first clock signal during both sleep and awake modes of the system;

means for receiving the first clock signal and the second clock signal and for determining whether the first clock signal is inactive, wherein the receiving means further comprises:

counter means coupled to the second clock signal for providing an enable signal per a predetermined number of second clock pulses, the counter means providing a series of enable signals;

sense circuit means for receiving the local bus clock signal and the enable signals to provide an indication of the status of the local bus clock signal; and means coupled to the sense circuit means and the second clock signal for synchronizing the series of enable signals with the second clock signal; and means responsive to the receiving means for synchronously switching in the second clock signal to drive the memory controller when the first clock signal is inactive.

2. The system of claim 1 wherein the first clock signal is a local bus clock signal.

3. The system of claim 2 in which the second clock signal is a pixel clock signal.

4. The system of claim 3 in which the switching means comprises:

means for receiving the local bus clock signal and the second clock signal;

means for preventing the second clock signal from propagating to the memory controller when the local bus clock signal is active; and means for allowing the second clock signal to drive the memory controller when the local bus clock signal is inactive.

5. The system of claim 4 in which the switching means further comprises:

means for synchronizing the local bus clock signal.

6. A method for allowing a memory controller within a computer to display information when the computer is in a sleep mode comprising the steps of:

using a first clock signal, the first clock signal being normally in an active status and driving the memory controller and being in an inactive status when the system is in the sleep mode;

using a second clock signal, the second clock signal being active independently from the first clock signal during both sleep and awake modes of the system;

sensing whether the first clock signal is in the inactive status including:
providing an enable signal per a predetermined number of second clock signal pulses;
providing a series of enable signals from the second clock signal pulses;
receiving the local bus clock signal and the enable signal to provide an indication of the status of the local bus clock signal; and
synchronizing the series of enable signals with the second clock signal; and synchronously switching in the second clock signal to drive the memory controller when the first clock signal is in the inactive status.

7. The method of claim 6 in which the first clock signal is a local bus clock signal.

8. The method of claim 7 in which the second clock signal is a pixel clock signal.

9. The system of claim 8 in which the synchronously switching step further comprises:

(a) receiving the local bus clock signal and the second clock signal;

(b) preventing the second clock signal from propagating to the memory controller when the local bus clock signal is active; and (c) allowing the second clock signal to drive the memory controller when the local bus clock signal is inactive.

10. The method of claim 9 in which the synchronously switching steps further comprises:

(a) synchronizing the local bus clock signal.

* * * * *